United States Patent
Yu et al.

(10) Patent No.: US 9,741,133 B2
(45) Date of Patent: Aug. 22, 2017

(54) IDENTIFYING SHAPES IN AN IMAGE BY COMPARING BÉZIER CURVES

(71) Applicant: Adobe Systems Incorporated, San Jose, CA (US)

(72) Inventors: Fan Yu, Santa Clara, CA (US); Frederic Thevenet, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 23 days.

(21) Appl. No.: 14/869,959

(22) Filed: Sep. 29, 2015

(65) Prior Publication Data

US 2017/0091956 A1 Mar. 30, 2017

(51) Int. Cl.
*G06T 7/60* (2017.01)
*G06K 9/62* (2006.01)
*G06T 3/00* (2006.01)
*G06T 7/136* (2017.01)

(52) U.S. Cl.
CPC .............. *G06T 7/60* (2013.01); *G06K 9/6202* (2013.01); *G06K 9/6267* (2013.01); *G06T 3/00* (2013.01); *G06T 7/136* (2017.01); *G06T 2207/10004* (2013.01)

(58) Field of Classification Search
CPC ... G06T 7/60; G06T 3/00; G06T 2207/10004; G06T 2207/20148; G06T 7/136; G06K 9/6202; G06K 9/6267
See application file for complete search history.

(56) References Cited

U.S. PATENT DOCUMENTS

| 5,134,688 | A | * | 7/1992 | Corthout | G06T 11/001 345/442 |
| 5,611,036 | A | * | 3/1997 | Berend | G06T 11/001 345/441 |
| 7,623,998 | B1 | * | 11/2009 | Yu | G06T 11/203 345/423 |

(Continued)

FOREIGN PATENT DOCUMENTS

FR 2661999 A1 11/1991

OTHER PUBLICATIONS

Combined Search and Examination Report as received in Application No. GB1612847.2 mailed Jan. 25, 2017, 6 pages.

*Primary Examiner* — Yon Couso
(74) *Attorney, Agent, or Firm* — Keller Jolley Preece

(57) ABSTRACT

The present disclosure is directed to identifying shapes in an image. For example, a shape identification system may identify an unknown shape represented by a Bézier path that has at least one Bézier curve. The shape identification system may also identify a stored Bézier path that has at least one stored Bézier curve, for example, in a database of known shapes. Using the Bézier curve of the unknown shape and the stored Bézier curve of the known shape, the shape identification system can determine a transformation matrix that transforms the transforms the Bézier curve of unknown shape to the stored Bézier curve of the known shape. Then, the shape identification system can compare the transformed Bézier curve to the stored Bézier curve to determine whether the unknown shape matches the known shape.

20 Claims, 7 Drawing Sheets

(56) References Cited

U.S. PATENT DOCUMENTS

| | | | |
|---|---|---|---|
| 9,330,495 B2* | 5/2016 | Goel | G06T 17/20 |
| 2004/0090437 A1* | 5/2004 | Uesaki | G06T 17/30 |
| | | | 345/420 |
| 2013/0101186 A1* | 4/2013 | Walch | G06K 9/00093 |
| | | | 382/125 |
| 2015/0077420 A1* | 3/2015 | Bolz | G06T 11/203 |
| | | | 345/442 |
| 2016/0275710 A1* | 9/2016 | Yoo | G06T 11/203 |

\* cited by examiner

Business Tax Form

Form X-1

Part I | Business Information

1 Name

2 Business Name

3 Classification (select one)
○ Individual   ○ C Corporation   ○ S Corporation   ○ Partnership   ○ LLC   ○ Other If other is selected: ▲ _____

4 Exemptions
Code: _____

5 Address

6 City, State, and ZIP code

Requestor's name and address (optional)

Part II | Taxpayer Identifier

Enter your Social Security Number or Taxpayer Identifier Number

Social Security Number [ ___ - ___ - ____ ]   or   Employer Identifier Number [ ___ - _____ ]

Part III | Business Locations

Select places where your business operates (check all that apply).

☐ United States   ☐ Mexico   ☐ Europe   ☐ Asia
☐ Canada   ☐ Central/South America   ☐ Africa   ☐ Australia Sign Here   Requestor's Signature ▲ _____   Date ▲ _____

*Fig. 2*

IDENTIFYING SHAPES IN AN IMAGE BY COMPARING BÉZIER CURVES

BACKGROUND

1. Technical Field

One or more embodiments of the present disclosure relate generally to shape identification in an image. More specifically, one or more embodiments of the present disclosure relate to systems and methods for identifying shapes in an image by using Bézier curves.

2. Background and Relevant Art

Computing devices are useful in identifying various shapes and features in images. For example, a user may use a computing device to detect faces, animals, or other objects in an image. One popular method of performing image recognition is the Hough transform, which uses a feature extraction technique to find objects in an image. Conventional systems and methods, including the Hough transform, however, perform image recognition by comparing pixels in an image to pixels of a known object. These conventional systems and methods require intensive processing power and large amounts of computer resources.

To illustrate, an image may include a circle. To identify the circle, conventional systems and methods detect every pixel belonging to an unknown object (e.g., the circle). In many circumstances, the conventional systems and methods create arrays and/or matrices for each detected edge pixel (i.e., pixels that form the outline of the unknown object). For example, for each detected edge pixel, the conventional systems and methods perform a series of algorithms to identify characteristics of the edge pixels, such as the angle and distance of the edge pixel. Then, using the calculated information, the conventional systems and methods try to identify the unknown object by comparing the edge pixel to pixels of known shapes until the conventional systems and methods identify a shape that matches the unknown object.

Consequently, conventional systems and methods require a large computational cost, which often results in a user waiting longer periods for a computing device to detect the shape of the unknown object. Further, unknown objects that are larger in size or have a larger number of pixels require even greater amounts of computational cost to detect a known shape that matches the unknown objects. Likewise, under the conventional systems and methods, images that include multiple unknown objects further increase the computational expense needed to detect each unknown object.

Furthermore, even without considering the computational expense, many conventional systems and methods still do not produce accurate shape matches for unknown objects. Because conventional systems perform pixel comparisons, an object that is a different size, rotated, or skewed may not be correctly matched or recognized. For example, a circle that is slightly skewed may be incorrectly matched to an oval, or may result in a conventional system returning a result of no matching known shape. Likewise, an enlarged image of a known object may not be correctly matched to the known object due to its enlarged nature in the image.

Thus, these and other problems exist with regard to image recognition, and in particular, shape recognition in the field of computer vision.

BRIEF SUMMARY

Embodiments of the present disclosure provide benefits and/or solve one or more of the foregoing or other problems in the art with systems and methods for identifying shapes (e.g., shapes corresponding to objects or persons) in an image. More specifically, the disclosed systems and methods identify shapes in an image by detecting and comparing Bézier curves for shapes in the image to Bézier curves for known shapes. By using Bézier curves to identify shapes, the systems and methods disclosed herein can reduce computational costs. Further, the systems and methods can improve the accuracy of identifying unknown objects in an image.

To illustrate, in one or more embodiments, the disclosed systems and methods identify an unknown shape in an image. For the unknown shape, the systems and methods generate one or more Bézier curves, which when linked together form a Bézier path. As such the Bézier path represents the unknown shape. The systems and methods also identify a known shape having at least one stored Bézier curve and a stored Bézier path representing the known shape. Using a Bézier curve of the unknown shape and a stored Bézier curve of the known shape, the systems and methods determine a matrix transformation for transforming the Bézier curve of the unknown shape to the stored Bézier curve of the known shape. The systems and methods can then determine if the transformed Bézier curve of the unknown shape matches the Bézier curve of the known shape. Additionally or alternatively, the systems and methods apply the matrix transformation to the Bézier path of the unknown shape, upon which, the systems and methods can compare the transformed Bézier path to the Bézier path for the known shape to determine if the unknown shape matches the known shape.

The disclosed systems and methods reduce the computational cost required to identify objects in an image. Specifically, the systems and methods can detect the shape of an object using a minimal number of Bézier points. As an example, the systems and methods can detect a circle or an oval based on four Bézier points rather than requiring analysis of every point along an edge of the unknown shape. As such, the systems and methods can decrease the expense needed to identify objects as well as increase the speed at which objects can be identified. Thus, by using Bézier curves to identify shapes in an image, the systems and methods can provide a significant improvement over conventional systems and methods.

In addition, the disclosed systems and methods can improve accuracy when identifying unknown shapes. In particular, by using Bézier curves, the system and methods can account for an unknown shape that differs in size, is rotated, or is skewed in comparison to a corresponding known shape. For example, if an unknown shape is skewed, the skew is accounted for when transforming and comparing the Bézier curves in the Bézier path of the unknown shape to a corresponding known shape.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope.

Rather the foregoing summary identifies aspects of embodiments as a prelude to the detailed description presented below.

BRIEF DESCRIPTION OF THE DRAWINGS

In order to describe the manner in which the above recited and other advantages and features of the disclosed methods and systems can be obtained, a more particular description of this disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore considered to be limiting in scope, various embodiments will be described and explained with additional specificity and detail through the use of the accompanying drawings in which:

FIG. 2 illustrates an example unstructured form in which the shape identification system can identify various shapes in accordance with one or more embodiments;

DETAILED DESCRIPTION

Figure 1:
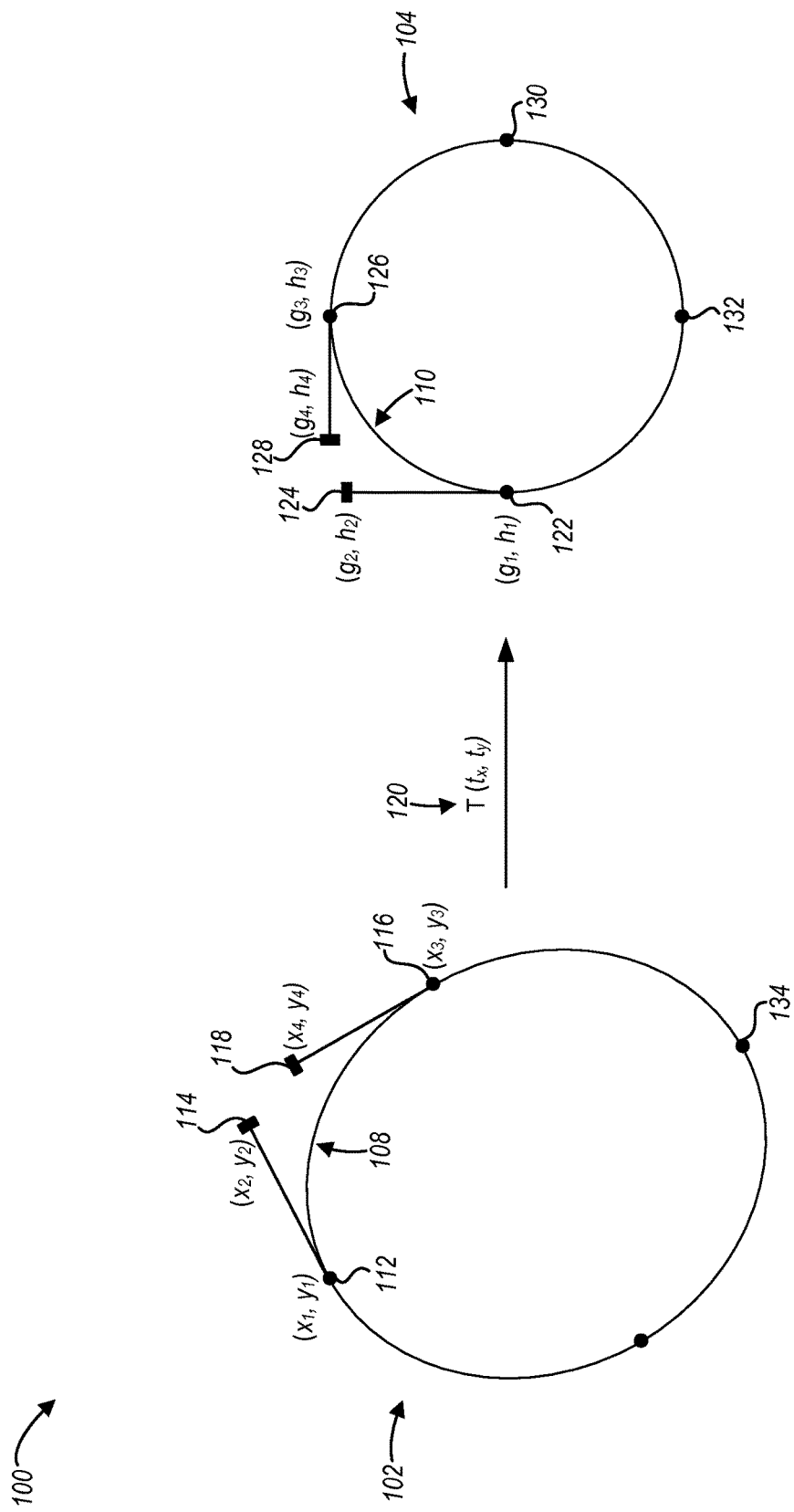
FIG. 1 illustrates a transformation method for transforming an unknown shape to a known shape in accordance with one or more embodiments.

One or more embodiments of the present disclosure include a shape identification system that identifies the shape of an unknown shape or object (e.g., from an image). In particular, in one or more embodiments, the shape identification system uses one or more Bézier curves of an unknown shape to match the unknown shape to a known shape. By using Bézier curves, the shape identification system can perform shape identification with less computational cost than conventional systems as well as provide greater accuracy than conventional systems. Further, the benefits of the shape identification system increase significantly for images having multiple unknown shapes that need identification.

To illustrate, in one example implementation, the shape identification system receives an unstructured form, which includes a number of unknown shapes. The shape identification system identifies Bézier curves for each unknown shape. For each unknown shape, the shape identification system can use matrix transformations to compare Bézier curves of the unknown shapes to Bézier curves in known shapes to identify matches between the unknown shapes and the known shapes.

Once the shape identification system identifies each unknown shape, the shape identification system can add structure to the form and allow a user to interact with the form. For example, upon identifying a comb field, the shape identification system can apply the proper structure to the form to allow the user to enter one character per cell in the comb field and auto-advance from one cell to the next as the user provides text input. As another example, the shape identification system can use Bézier curves to perform facial recognition or signature recognition and verification in images using similar methods and techniques.

As used herein, the term "Bézier curve" refers to a parametric curve that can be used to model smooth curves. A Bézier curve can represent one or more shapes within an image. In particular, a shape identification system can utilize edge detection techniques to identify edge points for a shape within an image and then convert a path running through all the edge points into one or more Bézier curves (e.g., using 8-way tracing to walk through the image clockwise to identify all the edge points). To accomplish this, in some embodiments, control points are identified from the edge points and the Bézier curves are fit to the control points. In one or more embodiments, the control points represent local maximum or minimum points, or corner points. One example description of Bézier curves, and calculating a Bézier curve representing an identifies shape, is provided in U.S. Pat. No. 7,623,998 entitled "SYSTEMS AND METHODS FOR IDENTIFYING BÉZIER CURVES FROM A SHAPE," filed by Fan Yu on May 5, 2006, having the same assignee as the present application, and which is hereby incorporated by reference in its entirety. In addition, the term "Bézier path," as used herein, generally refers to one or more linked Bézier curves that combine to represent a shape (e.g., of an object or person).

As used herein, the term "Bézier point" or "control point" refers to a data point that is associated with or defines a Bézier curve. Examples of a Bézier point include curve points (or smooth point), sharp points (or corner points), and local extrema points. Bézier points can include end points that lie on the curve itself as well as intermediate control points that generally do not lie on the curve. As used herein, the term "Bézier point" typically refers to an end point of a Bézier curve while the term "Bézier control point" typically refers to an intermediate control point that does not lie on the Bézier curve. As such, each Bézier curve is defined by two Bézier points (i.e., end points) in addition to two Bézier control points (which could overlap with the two Bézier points). As discussed in more detail below, the disclosed shape identification system utilizes the Bézier points and Bézier control points to match a Bézier curve from an unknown shape to one or more Bézier curves from known shapes. Examples of Bézier points and Bézier control points are provided below with respect to FIG. 1.

FIG. 1 illustrates a transformation 100 of an unknown shape 102 to a known shape 104. In one or more embodiments, a shape identification system (e.g., shape identification system 302 shown in FIG. 3 and described below) performs the transformation 100 to match the unknown shape 102 to one or more known shapes that are stored or accessed by the shape identification system. The unknown shape 102 represents a shape derived from an image provided to the shape identification system. In particular, the unknown shape 102 can represent an object, a portion of an unstructured form, or a person within the image. In addition, as shown in FIG. 1, the unknown shape 102 includes a plurality of Bézier curves collectively forming a Bézier path representing the unknown shape 102. Similarly, the known shape 104 includes a plurality of Bézier curves collectively forming a Bézier path representing the known shape 104.

Using the Bézier curves for the unknown shape 102 and the Bézier curves for the known shape 104, the shape identification system is able to determine if the unknown shape 102 matches the known shape 104 even if the unknown shape 102 is enlarged or shrunken, rotated, flipped, and/or skewed relative to the known shape 104, as will now be explained in additional detail.

In one or more embodiments, the shape identification system identifies the unknown shape 102 and the Bézier curves representing the unknown shape. Although FIG. 1 illustrates the unknown shape 102 as having a particular number of Bézier curves forming a particular shape, one will appreciate that the embodiments disclosed herein can be applied to an unknown shape represented by any number of Bézier curves (e.g., such as a single Bézier curves or many more Bézier curves). Furthermore, the embodiments disclosed herein can be applied to any shapes and configurations of Bézier curves representing a shape within an image. As non-limiting examples, the Bézier curves may represent a face, a form field, an object, a signature, text, or any other shape derived from an image. Furthermore, the embodiments described herein can be applied to identify multiple shapes within a single image.

As discussed above, in one or more embodiments, the unknown shape 102 is derived from an image. For example, the Bézier curves of the unknown shape 102 can represent edges identified within an image using any of a variety of edge detection methods technologies. The detected edges can be converted to one or more Bézier curves, as explained in more detail in U.S. Pat. No. 7,623,998, which is referenced above. Thereafter, the shape identification system can utilize the Bézier curves of the unknown shape 102 to match the unknown shape to one or more known shapes, such as known shape 104.

In comparing the unknown shape 102 to the known shape 104, the shape identification system first identifies a Bézier curve of the unknown shape 102 to compare to one or more Bézier curves of the known shape 104. To illustrate, as shown in FIG. 1, the shape identification system can identify a first Bézier curve 108 of the unknown shape 102. As further shown, the first Bézier curve 108 includes and/or is defined by a first Bézier point 112, a second Bézier point 116, a first Bézier control point 114, and a second Bézier control point 118. For purposes of explanation, the first Bézier point 112 is represented by the coordinates $(x_1, y_1)$, the first Bézier control point 114 is represented by the coordinates $(x_2, y_2)$, the second Bézier point 116 is represented by the coordinates $(x_3, y_3)$, and the second Bézier control point 118 is represented by the coordinates $(x_4, y_4)$. For simplicity and ease of explanation, not every Bézier point and Bézier curve is labeled on the unknown shape 102 in FIG. 1.

After selecting the first Bézier curve 108, the shape identification system then determines if the first Bézier curve 108 matches one or more Bézier curves of the known shape 104. For illustration purposes, the following details an example process for determining if the first Bézier curve 108 matches a second Bézier curve 110 representing a portion of the known shape 104. A similar process, however, can be repeated for every Bézier curve of the known shape 104 or any other known shapes. Further, the entire process can be repeated for every Bézier curve of the unknown shape 102. Generally, the shape identification system includes or has access to a stored database or cache of known shapes (e.g., a database of Bézier curves and Bézier paths for known shapes). In this manner, the shape identification system can compare a Bézier curve from an unknown shape to the Bézier curves of multiple known shapes.

As shown in FIG. 1, the second Bézier curve 110 includes and/or is defined by a first stored Bézier point 122 a first stored Bézier control point 124, a second stored Bézier point 126, and a second stored Bézier control point 128. Like the unknown shape 102, the positions of the Bézier points of the known shape are represented by coordinate values. Specifically, as shown with respect to the known shape 104, the first stored Bézier point 122 is represented by the coordinate $(g_1, h_1)$, the first stored Bézier control point 124 is represented by the coordinate $(g_2, h_2)$, the second stored Bézier point 126 is represented by the coordinate $(g_3, h_3)$, and the second stored Bézier control point 128 is represented by the coordinate $(g_4, h_4)$. Further, while only one stored Bézier curve is labeled in FIG. 1, the shape identification system can access and utilize information for each Bézier curve in the Bézier path of the known shape 104.

As mentioned above, once the shape identification system selects the first Bézier curve 108 of the unknown shape 102 and the second Bézier curve 110 of the known shape 104, the shape identification system then determines if the first Bézier curve 108 matches the second Bézier curve 110 and also whether the unknown shape 102 matches the known shape 104. To do so, in one or more embodiments, the shape identification system uses the first Bézier curve 108 and the second Bézier curve 110 to determine a transformation (e.g., a matrix transformation) for transforming the first Bézier curve 108 to the second Bézier curve 110.

To illustrate, the shape identification system can identify a transformation matrix 120 (labeled in FIG. 1 as T, and having transformation factors of $t_x$ and $t_y$) that can be applied to the first Bézier curve 108 to align the first Bézier curve 108 with the second Bézier curve 110. In particular, the shape identification system identifies a transformation matrix 120 that modifies the position, scale, rotation, and/or skew of the first Bézier curve 108 of the unknown shape 102 to match the second Bézier curve 110 of the known shape 104. Thereafter, the shape identification system can apply the transformation matrix 120 to the first Bézier curve 108 and/or additional Bézier curves of the unknown shape 102, and then compare one or more points of the transformed unknown shape 102 to the known shape 104 to see if they match.

In one or more embodiments, the shape identification system can utilize Bézier points from the first Bézier curve 108 and the second Bézier curve 110 to determine the transformation matrix 120. For example, the transformation matrix 120 can include various transformation variables and the shape identification system can utilize the Bézier points to identify or solve for the transformation variables of the transformation matrix 120. In one example embodiment, the transformation variables of the transformation matrix 120 are a, b, c, d, $t_x$, and $t_y$, and the transformation matrix 120 is defined by the following Equation 1:

$$\begin{bmatrix} g \\ h \end{bmatrix} = \begin{bmatrix} a & b \\ c & d \end{bmatrix} \begin{bmatrix} x \\ y \end{bmatrix} + \begin{bmatrix} t_x \\ t_y \end{bmatrix} = \begin{bmatrix} ax + by + t_x \\ cx + dy + t_y \end{bmatrix} \quad (1)$$

As shown in Equation 1, the transformation matrix 120 transforms the (x, y) coordinates of the Bézier points of the unknown shape 102 to the corresponding (g, h) coordinates of the Bézier points of the known shape 104. In order to perform the transformation, however, the shape identification system first determines the transformation variables a, b, c, d, $t_x$, and $t_y$ that transform the Bézier points of the unknown shape 102 to match the Bézier points of the known shape 104.

In some embodiments, the shape identification system determines the transformation variables using the coordinates of the Bézier points and Bézier control points from the first Bézier curve 108 of the unknown shape 102 and corresponding coordinates of the Bézier points and Bézier control points from the second Bézier curve 110 of the known shape 104. In particular, the shape identification system generates a system of equations using Equation 1 and the coordinates from any three out of four Bézier points (including Bézier control points) of the first Bézier curve 108 and corresponding Bézier points of the second Bézier curve 110. This results in a system of six equations that allow the shape identification system to solve for the six unknown transformation variables.

To illustrate, in one or more embodiments, the shape identification system uses the coordinates of the first Bézier point 112 (i.e., $(x_1, y_1)$), the first Bézier control point 114 (i.e., $(x_2, y_2)$), and the second Bézier point 116 (i.e., $(x_3, y_3)$) from the first Bézier curve 108 and corresponding coordinates of the first stored Bézier point 122 (i.e., $(g_1, h_1)$), the first stored Bézier control point 124 (i.e., $(g_2, h_2)$), and the second stored Bézier point 126 (i.e., $(g_3, h_3)$) from the second Bézier curve 110, to generate a system of six equations to find the transformation variables a, b, c, d, $t_x$, and $t_y$, of the transformation matrix 120. Specifically, in one example embodiment, the shape identification system generates the following system of equations:

$$g_1 = ax_1 + by_1 + tx \tag{2}$$

$$h_1 = cx_1 + dy_1 + ty \tag{3}$$

$$g_2 = ax_2 + by_2 + tx \tag{4}$$

$$h_2 = cx_2 + dy_2 + ty \tag{5}$$

$$g_3 = ax_3 + by_3 + tx \tag{6}$$

$$h_3 = cx_3 + dy_3 + ty \tag{7}$$

By solving the above systems of equations, or a similar system of equations derived from the coordinates of the first Bézier curve 108 and the second Bézier curve 110, the shape identification system can identify the values of transformation variables a, b, c, d, $t_x$, and $t_y$. As such, the shape identification system can determine the transformation between the position, scale, rotation, and/or skew of the Bézier curve of the unknown shape 102 and the Bézier curve of the known shape 104, which are represented by the transformation variables.

The shape identification system, in various embodiments, can plug the transformation variables back into the transformation matrix 120 to transform a Bézier point from the unknown shape 102 and compare it to a corresponding Bézier point from the known shape 104. For example, in one embodiment, the shape identification system applies the transformation matrix 120 to the second Bézier control point 118 and then compares the second Bézier control point 118 to the second stored Bézier control point 128 of the second Bézier curve 110. If, for example, the transformed coordinates of the second Bézier control point 118 match (e.g., within a threshold or acceptable margin for error) the coordinates of the second stored Bézier control point 128, then the shape identification system can determine that the first Bézier curve 108 matches the second Bézier curve 110. For example, the shape identification system can utilize the following equation to apply the transformation matrix 120 to the second Bézier control point 118 and determine if the transformed version of the second Bézier control point 118 matches the second stored Bézier control point 128:

$$\begin{bmatrix} x_4 \\ y_4 \end{bmatrix} \begin{bmatrix} a & b \\ c & d \end{bmatrix} + \begin{bmatrix} t_x \\ t_y \end{bmatrix} = \begin{bmatrix} ax_4 + by_4 + t_x \\ cx_4 + dy_4 + t_y \end{bmatrix} = \begin{bmatrix} g_4 \\ h_4 \end{bmatrix} \tag{8}$$

If the above Equation 8 is true (i.e., if the transformation of $(x_4, y_4)$ yields $(g_4, h_4)$) within an acceptable threshold or margin for error, the first Bézier curve 108 matches the second Bézier curve 110. The shape identification can repeat this process to check each Bézier point of the unknown shape 102 to determine if the unknown shape 102 matches the known shape 104. More specifically, the shape identification system can apply the matrix transformation to any or all of the Bézier points and/or Bézier curves of the unknown shape 102 and then compare the transformed Bézier points and/or curves to the corresponding Bézier points and/or curves of the known shape 104 to determine if a match exists.

In one or more embodiments, the shape identification system determines a match when the coordinates of the Bézier points along the transformed Bézier path of the unknown shape 102 align with the coordinates of the Bézier points along the stored Bézier path of the known shape 104. In some embodiments, the shape identification system may determine that corresponding coordinates align between the transformed Bézier path and the stored Bézier path when the coordinates are within a preset tolerance level (e.g., a preset threshold or margin for error) of each other. For example, when the shape identification system is determining whether two shapes match, the shape identification system can align the two Bézier paths by overlaying or otherwise comparing the transformed Bézier path for the unknown shape 102 over/to the stored Bézier path for the known shape 104. If the coordinates align or if any misalignment is within an acceptable tolerance, then the shape identification system determines that the unknown shape 102 matches the known shape 104. Using this information, the shape identification system can classify and/or assign properties to the unknown shape 102 based on a classification and/or properties of the known shape.

As mentioned above, the shape identification system can repeat this process to compare the first Bézier curve 108 of the unknown shape 102 to the remaining Bézier curves of the known shape 104. For example, if using the transformation matrix 120 for transforming the first Bézier curve 108 to the second Bézier curve 110 does not yield a match, the shape identification system determines a new transformation matrix between the first Bézier curve 108 of the unknown shape 102 and another Bézier curve of the known shape 104. For example, the shape identification system can determine a matrix transformation between the first Bézier curve 108 of the unknown shape 102 and a Bézier curve of the known shape 104 extending from the second stored Bézier point 126 and a third stored Bézier point 130 using the techniques and methods described above. Using the newly derived matrix transformation, the shape identification system can transform the Bézier path of the unknown shape 102 according to the updated matrix transformation and determine if the newly transformed Bézier path of the unknown shape 102 matches the stored Bézier path of the known shape 104.

The shape identification system can again repeat the process for the first Bézier curve 108 of the unknown shape 102 and a Bézier curve of the known shape 104 extending between the third stored Bézier point 130 and a fourth stored Bézier point 132. The shape identification system can use the foregoing principles again to compare the first Bézier curve 108 of the unknown shape 102 to a Bézier curve of the known shape 104 extending between the fourth stored Bézier point 132 and the first stored Bézier point 122.

If desired, the shape identification system can repeat the above process above for each of the Bézier curves of the unknown shape 102 to determine if the unknown shape 102 matches the known shape 104. Additionally or alternatively, the shape notification system can perform the process to compare the unknown shape 102 to any additional known shapes to determine if a match exists between the unknown shape and any known shapes, thereby allowing the shape identification system to identify and/or classify the unknown shape 102. In this manner, as long as a known shape that matches the unknown shape 102 is stored in the known shape database, the shape identification system will identify the match using the Bézier curve(s) of the unknown shape 102 and the known shapes. In this manner, the shape identification system can progress through each stored Bézier curve in the stored database of known shapes. For each Bézier curve transformation comparison (e.g., the comparison of the Bézier curve from the unknown shape 102 to a stored Bézier curve), the shape identification system determines a matrix transformation and applies the matrix transformation to the Bézier curve and/or path of the unknown shape 102. As the shape identification system progresses through each stored Bézier curve, the shape identification system can identify a match that transforms the Bézier path of the unknown shape 102 to the Bézier path of the matching known shape stored in the database.

With further reference to FIG. 1, the shape identification system may identify that the unknown shape 102 matches the known shape 104, and thus, the unknown shape 102 is a circle because the known shape 104 is defined as a circle. Specifically, the shape identification system may determine that the unknown shape 102, while enlarged, rotated, and/or skewed within the image, is within the tolerance levels to match the known shape 104. For example, after applying the transformation matrix 120 to the unknown shape 102, the shape identification system may determine that the transformation matrix evenly skews the unknown shape 102 such that the unknown shape 102 more-likely-than-not matches the known shape 104.

Alternatively, the shape identification system may determine that while some portions of the transformed Bézier path of the unknown shape 102 align with the Bézier path of the known shape 104, other portions do not align, or are outside of allowable tolerance levels that would indicate a match, with the Bézier path of the known shape 104. As such, the shape identification system may determine that the unknown shape 102, at least for the particular Bézier curve transformation comparison, does not match the known shape 104. To illustrate, while the shape identification system may identify a match between the transformed first Bézier curve 108 and the second Bézier curve 110, the shape identification system may determine that no match exists between the next Bézier curve along the transformed Bézier path of the unknown shape 102 (i.e., from the second Bézier point 116 to a third Bézier point 134) and the next Bézier curve along the stored Bézier path of the known shape 104 (i.e., from the second stored Bézier point 126 to the third stored Bézier point 130).

Because the shape identification system compares Bézier curves of an unknown shape to Bézier curves in known shapes, the shape identification system can quickly identify a match for the unknown shape as well as and classify the unknown shape. In other words, by using the Bézier curves rather than all the pixels represented by the Bézier curves, the shape identification system can reduce the computational cost and increase the computational speed needed to identify unknown shapes in an image or form. Further, through using Bézier curves, the shape identification system improves accuracy by identifying closer shape matches than previously accomplished by comparing pixels.

As mentioned above, the shape identification system can utilize the processes and features discussed herein to classify various types of images and/or corresponding shapes within the images. FIG. 2 illustrates an example unstructured form 200 in which the shape identification system can identify various shapes. As shown, the unstructured form 200 (or simply "form 200") is a business tax form. The form 200 can include various user input fields, such as blank text fields, radio buttons, check boxes, fill-in-the-blank fields, signature fields, etc. Because the form 200, however, is unstructured, a user cannot interact with the form 200 until the form 200 is converted into structured fields and known elements. As such, the shape identification system can utilize the principles described herein to identify the shapes within the form 200, classify the form 200 based on the identified shapes, as well as add structure and/or functionality to the form based on the identified shapes.

To illustrate, the shape identification system may receive the form 200 as an image or an unstructured document (e.g., an image of the form saved in a document format, such as a PDF). The shape identification system, in one or more embodiments, can identify various fields of the form by comparing Bézier curves representing the shapes found in the form 200 to Bézier curves representing known shapes (e.g., known form field elements). The shape identification system can then convert the form 200 into a structured document and apply user-input functionality to the detected shapes in the form 200.

For example, the shape identification system can detect blank text fields 202 based on detecting rectangles in the form 200. In particular, the shape identification system can create and/or identify one or more Bézier curves representing the blank text fields 202, and based on matching the Bézier curves for the blank text fields 202 to stored Bézier curves of known shapes, can classify the blank text fields 202 as form field elements and specifically as blank text-fillable fields. As such, the shape identification system can structure the form 200, thereby providing structured functionality to allow a user to input a line of text into the blank text fields 202.

As another example, the shape identification system can identify radio buttons 204 in the form 200. More specifically, the shape identification system can use Bézier curves for each radio button to detect a matching form field element stored in a database of known shapes, as described above. Further, in some embodiments, the shape identification system can determine, based on the grouping and position of each identified shape, that the identified shapes are radio buttons. Upon detecting a number of radio buttons, the shape identification system can add user-input functionality to the form 200 that allows the user to select one of the buttons at a time. Thus, the shape identification system detects and identifies the radio buttons 204 in the form 200 and adds user-input functionality to the form 200.

In addition, the shape identification system can identify fill-in-the-blank fields in the form 200. As shown, using the techniques and methods described above, the shape identification system uses the Bézier curves of the shape(s) associated with the fill-in-the-blank field 206 to determine the identity of the fill-in-the-blank field 206. For example, in various embodiments, the shape identification system determines that a triangle shape followed by a line indicates that the line is a fill-in-the-blank field (e.g., "If other is selected: ▶_____"). Then, as with the blank text fields 202, the shape identification system can add functionality to the fill-in-the-blank field 206 that allow a user to add text to the field. As another example, the shape identification system 302 can determine that a colon followed by a line indicates that the line is a fill-in-the-blank field (e.g., "Code: _____"). Alternatively, the shape identification system may identify that a line by itself indicates that the line is a fill-in-the-blank field.

The form 200 also includes two comb fields 208, each comb field having multiple cells. For reference, a comb field is a field of cells, where the cells are generally a fixed-width and each cell contains one character. The shape identification system can recognize the shape of the comb fields 208 by matching the Bézier curves of the unknown shapes that represent the comb fields to stored Bézier curves representing a known shape of a comb field. Upon detecting the comb fields 208 in the form 200, the shape identification system can structure the comb fields 208 of form 200 to allow a user to input one character (e.g., letter or number) per cell. Further, the shape identification system can add functionality to each cell that advances the cursor to the next cell in the comb field 208 when a user inputs a character into the cell.

As another example, the shape identification system can identify, using techniques and methods described above, check boxes 210 in the form 200. For example, as described above, the shape identification system can use the positioning, size, and layout of the boxes to identify a series of squares as check boxes. The shape identification system can then add structure to the form 200 that allows the user to select multiple check boxes.

In some embodiments, the shape identification system may also apply additional techniques, such as optical character recognition, to identify text along with the shapes in the form. For instance, the shape identification system may use the identified text along with adjacent recognized shapes to add user-input functionality to the form 200. To illustrate, the shape identification system can identify the words "select one" in connecting with identifying a set of circles to identify the circles as radio buttons 204. Similarly, the shape identification system can identify the words "check all that apply" in connection with identified squares boxes to determine that the identified squares are check boxes 210. As an additional example, the shape identification system can determine that the characters in the comb fields 208 should be numbers and not letters upon identifying the word "number" above the identified comb fields.

As a further example, the shape identification system can identify a signature field 212 based on identifying a rectangle shape that includes the words "Signature." As such, the shape identification system can add functionality to the field that allows a user to add their signature. For instance, the shape identification system can allow a user to enter text, create a signature using an input device, or select the signature field 212 to input a signature using other means (e.g., capture a signature with a camera, import an image of a signature, insert a stored signature, etc.). In additional or alternative examples, the principles described herein maybe applied to identify and/or classify any shapes derived from an image.

Figure 3:
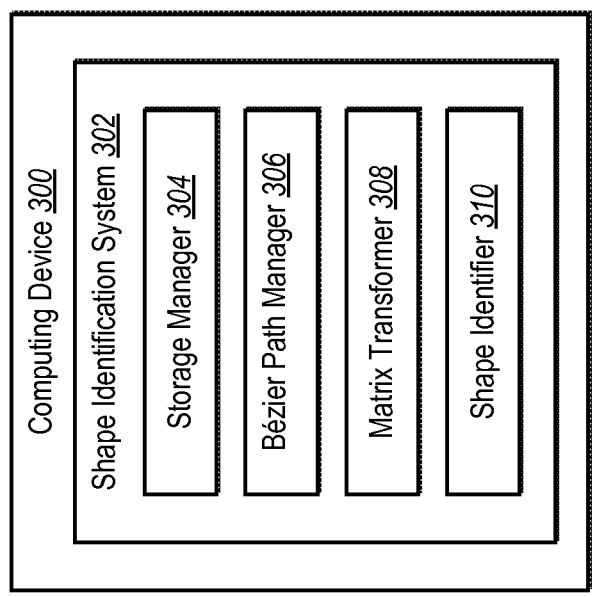
FIG. 3 illustrates an example schematic diagram of a shape identification system in accordance with one or more embodiments.

FIG. 3 illustrates an example schematic diagram of a computing device 300 that implements an example shape identification system 302 according to one or more embodiments. The computing device 300 can represent a variety of computing devices. For example, the computing device 300 may be a mobile device (e.g., a mobile telephone, a smartphone, a PDA, a tablet, a laptop, a camera, a tracker, a watch, a wearable device, etc.). In some embodiments, the computing device 300 may be a non-mobile device (e.g., a desktop computer or another type of client device). Additional details with respect to the computing device 300 are discussed below with respect to FIG. 7.

The shape identification system 302 can be one embodiment of the shape identification system described above in connection with FIG. 1 and FIG. 2. As shown, the shape identification system 302 can include various components for performing the processes and features described herein. The shape identification system 302 can compare Bézier curves for an unknown shape to the stored Bézier curves of known shapes, using a transformation matrix, to determine a match to a known shape.

As shown in FIG. 3, the shape identification system 302 includes a shape manager 304, a Bézier path manager 306, a matrix transformer 308 and a shape identifier 310. In general, the shape manager 304 identifies unknown shapes and stored shapes. The Bézier path manager 306 generates, accesses, or otherwise identifies Bézier curves from an unknown shape for comparison to Bézier curves for one or more known shapes. The matrix transformer 308 determines a transformation matrix that transforms a Bézier curve of an unknown shape to a stored Bézier curve for a known shape as well as applies the transformation matrix to the unknown shape (e.g., to a Bézier path of the unknown shape). The shape identifier 310 identifies when the Bézier path of the unknown shape matches the stored Bézier path of a known shape.

The components 304-314 of the shape identification system 302 can comprise software, hardware, or both. For example, the components 304-314 can comprise one or more instructions stored on a computer-readable storage medium and executable by processors of one or more computing devices, such as a client device or server device. When executed by the one or more processors, the computer-executable instructions of the shape identification system 302 can cause the computing device(s) to perform the feature learning methods described herein. Alternatively, the components 304-314 can comprise hardware, such as a special purpose processing device to perform a certain function or group of functions. Additionally or alternatively, the components 304-314 of the shape identification system 302 can comprise a combination of computer-executable instructions and hardware.

As mentioned above, the shape identification system 302 includes a shape manager 304. The shape manager 304 can identify unknown shapes. For example, when the shape identification system 302 receives an image or an unstructured document (e.g., an unstructured form), the shape manager 304 identifies one or more unknown shapes in the image or unstructured document. An example of an unstructured form is provided in FIG. 2, and described above.

The shape manager 304 also identifies known shapes. For example, the shape manager 304 may access a database or cache of known shapes. The database of known shapes may be stored on the computing device 300, or stored externally, such as on a server device. The database of known shapes can include a host of known shapes, information associated with the shapes, along with stored Bézier curves and a stored Bézier path for each known shape. Further, when the shape identification system 302 detects a new shape that does not match a known shape in the database of known shapes, the shape identification system 302 may prompt a user to define the new shape and the shape identification system 302 may add the new shape to the database.

The Bézier path manager 306, in general, generates, accesses, identifies, or otherwise manages Bézier curves representing an unknown shape. In one or more embodiments, the Bézier path manager 306 first determines each Bézier curve from the unknown shape. For example, the Bézier path manager 306 can determine Bézier curves for an unknown shape using the systems and methods disclosed in U.S. Pat. No. 7,623,998, which is also referenced above. Additionally or alternatively, the Bézier curve manager can access previously generated Bézier curves representing the unknown shape for comparison to the Bézier curves of known shapes.

The matrix transformer 308 can determine a transformation matrix that transforms a Bézier curve of an unknown shape to a stored Bézier curve of a known shape. In addition, the matrix transformer 308 can apply the transformation matrix to the Bézier curve or an entire Bézier path of the unknown shape. Specifically, the matrix transformer 308 can select a Bézier curve for the unknown shape. Using the selected Bézier curve, the matrix transformer 308 can create a transformation matrix that transforms the selected Bézier curve to match a stored Bézier curve of the known shape. The matrix transformer 308 can use the coordinates of the two Bézier curves, as described above, to generate a system of equations. The matrix transformer 308 can then solve the system of equations to identify transformation variables, which the matrix transformer 308 can use to build the transformation matrix.

In some embodiments, the matrix transformer 308 can verify that the transformation matrix accurately transforms or maps the selected Bézier curve of the unknown shape to the stored Bézier curve of the known shape. As described above, if the matrix transformer 308 uses three of the four coordinate pairs to create the transformation matrix, the matrix transformer 308 can use the fourth coordinate pair to verify that the transformation matrix accurately transforms the selected Bézier curve from the unknown shape to the stored Bézier curve of the known shape. If the matrix transformer 308 is not correct, the matrix transformer 308 may determine that the selected Bézier curve from the unknown shape is not compatible (i.e., not able to be matched) with the stored Bézier curve of the known shape.

Upon determining the transformation matrix or confirming that the Bézier curves match, the matrix transformer 308 can apply the transformation matrix to the remaining Bézier curves for the unknown shape (e.g., each Bézier curve in the Bézier path that represents the unknown shape). As a result, the matrix transformer 308 may generate a transformed Bézier path for the unknown shape.

The shape identifier 310 can determine whether the unknown shape matches the known shape. For example, the shape identifier 310 can compare the transformed Bézier path of the unknown shape to the stored Bézier path of the known shape. In particular, the shape identifier 310 compares one or more points of the transformed Bézier path of the unknown shape to one or more corresponding points of the stored Bézier path of the stored shape from which the stored Bézier curve is being compared. If the Bézier paths match, then the shape identifier 310 can determine that the unknown shape matches the known shape. As such, the shape identifier 310 can attribute properties and characteristics from the known shape to the unknown shape.

In some embodiments, the shape identifier 310 may determine that the Bézier paths match when the transformed Bézier path for the unknown shape is within a tolerance level of the stored Bézier path of the known shape. For example, the shape identifier 310 can essentially overlap the transformed Bézier path with the stored Bézier path to determine if the transformed Bézier path matches and/or is within a tolerance level of the stored Bézier path, or if the transformed Bézier path deviates too far from the stored Bézier path. In one or more embodiments, the shape identifier 310 compares the points of the transformed Bézier path to the corresponding points of the stored Bézier path and then calculates a point-by-point variance and/or a total variance between the points of the transformed Bézier path and the stored Bézier path. If the point-by-point variances and/or the total variance are within specified thresholds or acceptable margins, then the shape identifier 310 determines that the unknown shape matches the known shape.

If, however, the transformed Bézier path does not match the stored Bézier path, the shape identifier 310 can have the matrix transformer 308 identify and apply a new transformation matrix based on the same Bézier curve of the unknown shape and the next stored Bézier curve of the known shape. The shape identifier 310 can then again determine a match between the newly transformed Bézier path of the unknown shape using the newly derived transformation matrix and the stored Bézier path of the known shape. If, after applying a transformation matrix based on each combination of the Bézier curve of the unknown shape and each stored Bézier curve of the known shape, the shape identifier 310 fails to identify a match, the shape identifier 310 can determine that the unknown shape and the known shape are not matches.

In addition, if the shape identifier 310 determines that the unknown shape does not match the known shape, the shape identifier 310 can have the shape manager 304 identify and provide another known shape in the database of known shapes to the matrix transformer 308. The shape identifier 310 can then work with the matrix transformer 308 to repeat the process of comparing the Bézier curve of the unknown shape to stored Bézier curves of known shapes until a matching shape is identified.

Figure 4:
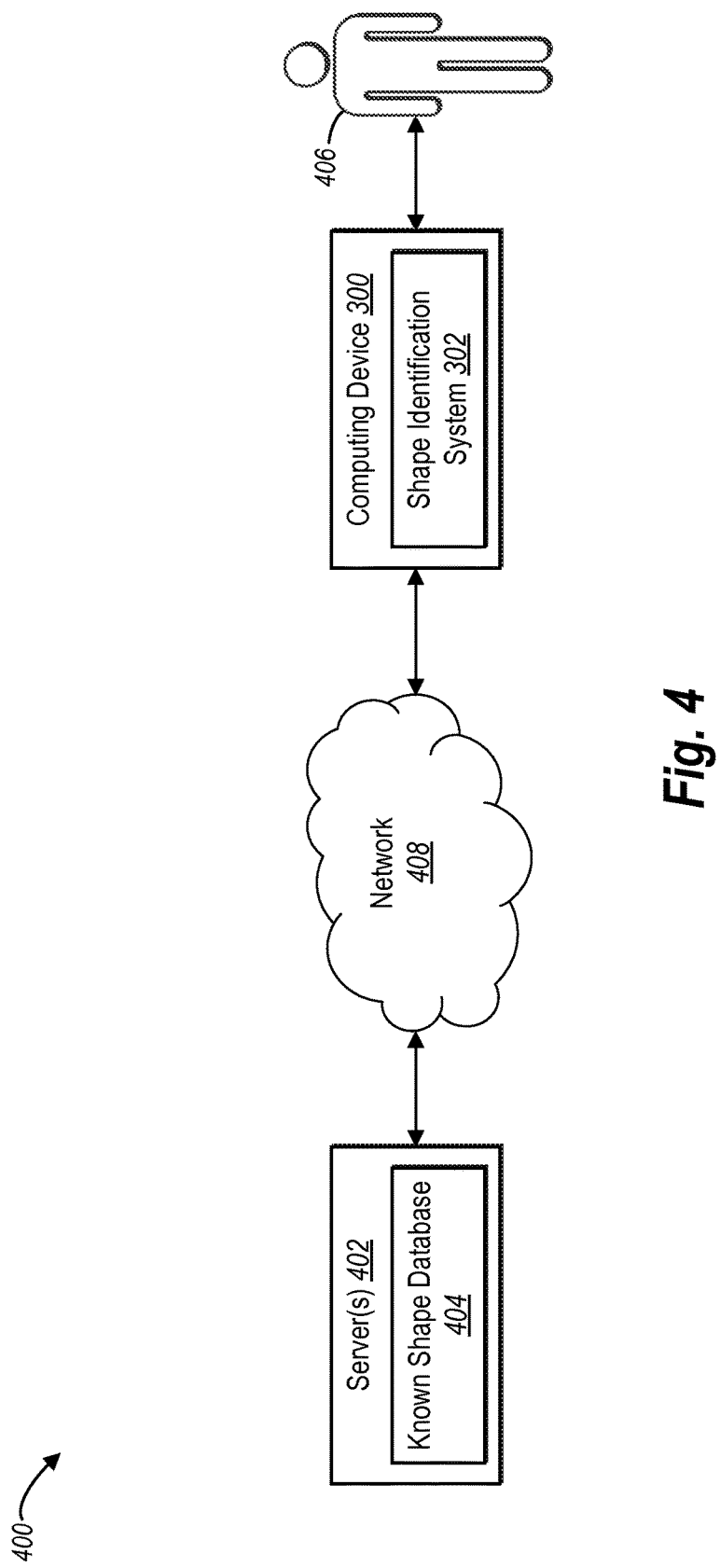
FIG. 4 illustrates a schematic diagram of an exemplary environment in which the shape identification system of FIG. 3 can operate in accordance with one or more embodiments.

FIG. 4 illustrates a schematic diagram of one embodiment of an exemplary environment 400 in which the shape identification system 302 of FIG. 3 can operate. In one or more embodiments, the environment 400 includes one or more servers 402 that host a known shape database 404. The exemplary environment 400 also includes a computing device 300 that hosts the shape identification system 302, and is associated with a user 406. The computing device 300 can communicate with the one or more servers 402 via a network 408.

Although the environment 400 of FIG. 4 is depicted as having various components, the environment 400 may have any number of additional or alternative components. For example, the environment 400 can include other components not shown in FIG. 4. Further, while FIG. 4 illustrates a particular arrangement of the shape identification system 302, the computing device 300, the one or more servers 402, the known shape database 404, and the network 408, various additional arrangements are possible. For instance, the shape identification system 302 may directly communicate with the known shape database 404, bypassing the network 408.

Furthermore, while the environment of FIG. 4 illustrates the shape identification system 302 and the known shape database 404 as separate components on different servers, in one or more embodiments the shape identification system 302 and the known shape database can be part of a single system on the same device (e.g., on the one or more servers 402 or on the computing device 300).

As mentioned, the computing device 300 and the one or more servers 402 communicate via the network 408. The network 408 may include one or more networks and may use one or more communications platforms or technologies suitable for transmitting data and/or communication signals. Additional details relating to communication platforms and technologies are explained below with reference to FIG. 7.

As illustrated in FIG. 4, a user 406 can interface with the computing device 300, for example, to access or use the shape identification system 302. The user 406 may be an individual (i.e., human user), a business, a group, or other entity. Although FIG. 4 illustrates only one user 406, it should be understood that the environment 400 can include a plurality of users that access or use the shape identification system 302. For example, in some embodiments, the shape identification system 302 may be located on the one or more servers 402 and users may each use a computing device to access and/or use the shape identification system 302.

As briefly mentioned above, a user 406 uses the computing device 300 to access and/or user the shape identification system 302. For example, the user downloads a file, such as an image or unstructured form or document to the computing device 300. The shape identification system 302 can detect shapes in the downloaded file and add user-input functionality to the file, as described above. As another example, the user may use the shape identification system 302 to identify faces, signatures, or other objects in the image, such as pets, landmarks, points of interest, etc. By using the shape identification system 302, the user can quickly and accurately detect shapes in the downloaded file, and in some cases, use the detected shapes to improve the user's ability to interact with the file.

Figure 5:
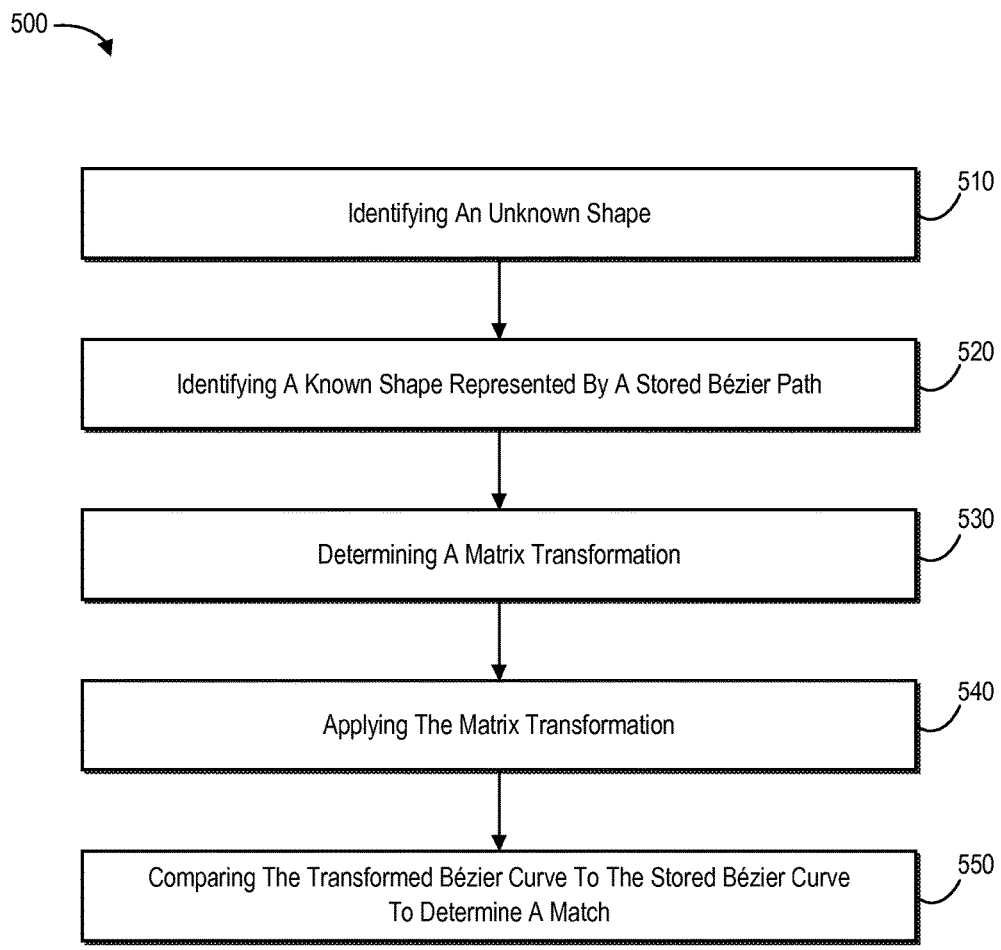
FIG. 5 illustrates a flowchart of a series of acts in a method for identifying a shape in an image in accordance with one or more embodiments.
Figure 6:
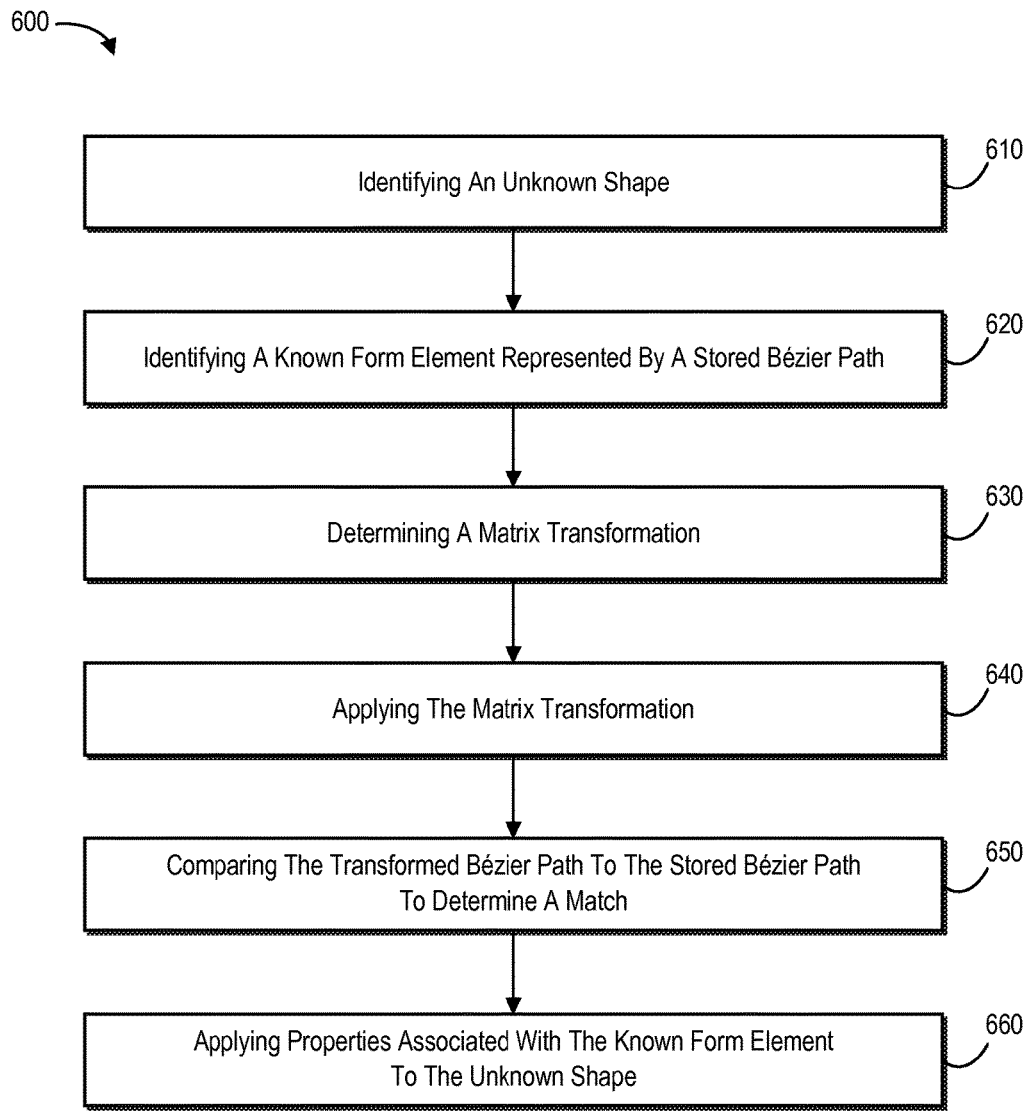
FIG. 6 illustrates a flowchart of a series of acts in another method for identifying a shape in an unstructured form in accordance with one or more embodiments.

FIGS. 1-4, the corresponding text, and the examples, provide a number of different systems and devices for identifying unknown shape in an image in accordance with one or more embodiments. In addition to the foregoing, one or more embodiments can also be described in terms of flowcharts comprising acts and steps in a method for accomplishing a particular result. For example, FIGS. 5 and 6 illustrate flowcharts of exemplary methods in accordance with one or more embodiments. The methods described in relation to FIGS. 5 and 6 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of a series of acts in a method 500 for identifying a shape in an image in accordance with one or more embodiments disclosed herein. A computing device (e.g., computing device 300 or computing device 700), can perform the method 500 in a digital medium environment for analyzing and classifying images. For example, the method 500 includes an act 510 of identifying an unknown shape. In particular, the act 510 may involve identifying an unknown shape (e.g., unknown shape 102) represented by a Bézier path, the Bézier path comprising at least one Bézier curve (e.g., the first Bézier curve 108). In some embodiments, the act 510 can involve receiving an image and detecting an unknown shape in the image.

In other embodiments, the act 510 may involve performing edge detection on an image to identify edges of the unknown shape, and based on the edge detection, identifying Bézier points for the unknown shape and/or generating a Bézier curve for the unknown shape. Further, the act 510 may also involve generating additional Bézier curves for the unknown shape and linking the Bézier curves of the unknown shape together to from the Bézier path representing the unknown shape.

The method 500 further includes an act 520 of identifying a known shape (e.g., known shape 104) represented by a stored Bézier path. In particular, the act 520 includes identifying a known shape represented by a stored Bézier path, the stored Bézier path comprising at least one stored Bézier curve (e.g., the second Bézier curve 110). In some embodiments, the known shape is stored in a database of known shapes (e.g., known shape database 404), where each known shape in the database includes one or more known Bézier curves. The act 520 may also involve identifying one or more known Bézier curves from each known shape in the database.

In addition, the method 500 includes an act 530 of determining a matrix transformation. In particular, the act 530 may involve determining a matrix transformation (e.g., transformation matrix 120) that transforms the at least one Bézier curve of the unknown shape to the at least one stored Bézier curve of the known shape. In one or more embodiments, the act 530 may also involve calculating a matrix transformation between the at least one Bézier curve and each of the one or more known Bézier curves from each known shape in the database of known shapes.

The method 500 also includes an act 540 of applying the matrix transformation. In particular, the act 540 may include applying the matrix transformation to the at least one Bézier curve of unknown shape. In various embodiments, the act 540 may also involve applying the matrix transformation to each Bézier curve of a plurality of Bézier curves associated with the path representing the unknown shape.

The method 500 further includes an act 550 of comparing the transformed Bézier curve to the stored Bézier curve to determine a match. In particular, the act 550 may involve comparing the transformed at least one Bézier curve representing the unknown shape to the at least one stored Bézier curve of the known shape to determine whether the unknown shape matches the known shape. In some additional embodiments, the act 550 involves determining that each Bézier curve of the plurality of Bézier curves associated with the path representing the unknown shape is within a tolerance level of a corresponding Bézier curve associated with the path representing the known shape.

The method 500 may also include additional acts. For example, the method 500 may include an act of classifying the unknown shape as the known shape upon determining that the Bézier path representing the unknown shape matches the stored Bézier path representing the known shape. In some acts, the transformation variables accounts for a change in scale, a change in skew, and a change in location between the at least one Bézier curve and the stored Bézier curve.

As another example, the method 500 may include another act of identifying Bézier points associated with the at least one Bézier curve and corresponding Bézier points associated with the stored Bézier curve. Further, this additional act may involve generating a plurality of equations based on the Bézier points associated with the at least one Bézier curve and the corresponding Bézier points associated with the stored Bézier curve where the plurality of equations including a plurality of transformation variables, and solving the plurality of equations to determine a plurality of transformation variables. In some embodiments, the Bézier points associated with the at least one Bézier curve include a Bézier point and a Bézier control point for the at least one Bézier curve and a Bézier point and Bézier control point for a next Bézier curve from the generated Bézier path. In addition, the corresponding Bézier points associated in the known Bézier curve include a stored Bézier point and a stored Bézier control point for the known Bézier curve and a stored Bézier point and stored Bézier control point for a next known Bézier curve from the stored Bézier path.

Further, the act may also involve the Bézier points associated with the at least one Bézier curve including a Bézier point and a Bézier control point for the at least one Bézier curve and a Bézier point and Bézier control point for a next Bézier curve from the generated Bézier path, and the corresponding Bézier points associated in the known Bézier curve include a stored Bézier point and a stored Bézier control point for the known Bézier curve and a stored Bézier point and stored Bézier control point for a next stored Bézier curve from the stored Bézier path. In addition, solving the plurality of equations to determine the plurality of transformation variables includes solving the six equations to determine six transformation variables. Moreover, determining the matrix transformation that transforms the at least one Bézier curve to the stored Bézier curve includes determining the matrix transformation based on the transformation variables. Additionally or alternatively, the method 500 may include any other steps or processes described in more detail above.

FIG. 6 illustrates a flowchart of a series of acts in a method 600 for identifying a shape in an unstructured form in accordance with one or more embodiments disclosed herein. A computing device (e.g., computing device 300 or computing device 700), can perform the method 600 in a digital medium environment for analyzing and classifying images. For example, the method 600 includes an act 610 of identifying an unknown shape 102. In particular, the act 610 may involve identifying an unknown shape represented by a Bézier path, the Bézier path comprising at least one Bézier curve. In some embodiments, the act 610 can involve receiving an image (e.g., form 200) and detecting an unknown shape in the image. In other embodiments, the act 610 may involve performing edge detection on an image to identify edges of the unknown shape, and based on the edge detection, identifying Bézier points for the unknown shape. Further, the act 610 may also involve generating additional Bézier curves for the unknown shape and linking the Bézier curves of the unknown shape together to from the Bézier path representing the unknown shape.

The method 600 further includes an act 620 of identifying a known form element represented by a stored Bézier path. In particular, the act 620 includes identifying a known form element represented by a stored Bézier path, the stored Bézier path comprising at least one stored Bézier curve. In some embodiments, the known form element is stored in a database of known shapes, including known form elements, where each known form element in the database includes one or more known Bézier curves. The act 620 may also involve identifying one or more known Bézier curves from each known form element in the database.

In addition, the method 600 includes an act 630 of determining a matrix transformation. In particular, the act 630 may involve determining a matrix transformation that transforms the at least one Bézier curve of the unknown shape to the at least one stored Bézier curve. In one or more embodiments, the act 630 may also involve calculating a matrix transformation between the at least one Bézier curve and each of the one or more known Bézier curves from each known from element in the database of known shapes.

The method 600 also includes an act 640 of applying the matrix transformation. In particular, the act 640 may include applying the matrix transformation to the at least one Bézier curve of the unknown shape. In various embodiments, the act 640 may also involve multiplying the matrix transformation with each Bézier curve of a plurality of Bézier curves associated with the path representing the unknown shape.

The method 600 further includes an act 650 of comparing the transformed Bézier path to the stored Bézier path to determine a match. In particular, the act 650 may involve comparing the transformed Bézier path of the unknown shape to the stored Bézier path of the known form element to determine whether the unknown shape matches the known form element. In some additional embodiments, the act 650 involves determining that each Bézier curve of the plurality of Bézier curves associated with the path representing the unknown shape is within a tolerance level of a corresponding Bézier curve associated with the path representing the known from element.

Additionally, the method 600 includes an act 660 of applying properties associated with the known form element to the unknown shape. In particular, the act 660 may involve applying properties associated with the known form element to the unknown shape. In some embodiments, the act 660 may also include applying user-input functionality to the unknown shape based on the properties applied to the unknown shape. In one or more embodiments, the known element is one of a blank text field, a radio button, a check box, or a comb field.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
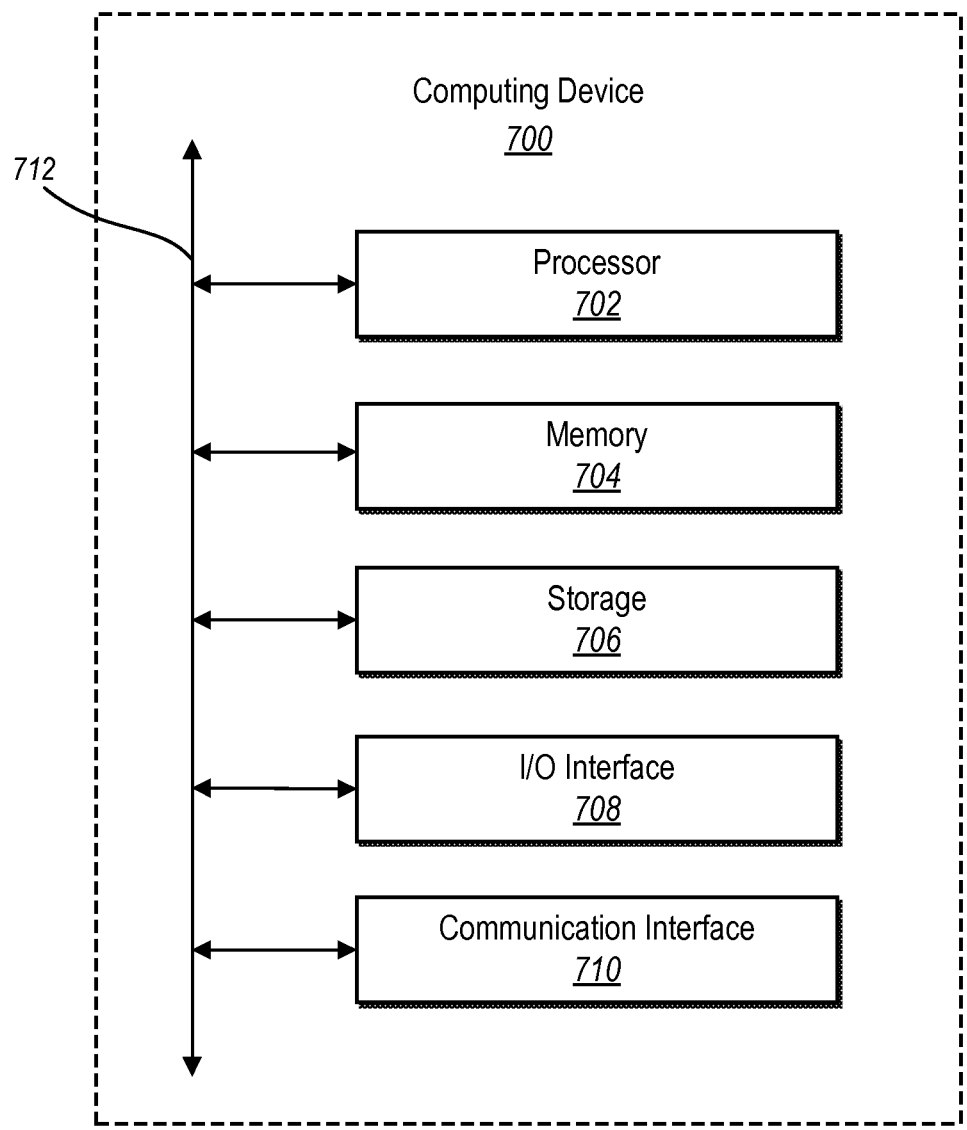
FIG. 7 illustrates a block diagram of an exemplary computing device in accordance with one or more embodiments.

FIG. 7 illustrates a block diagram of an exemplary computing device 700 that may be configured to perform one or more of the processes described above. One will appreciate that one or more computing devices, such as the computing device 700 may host the shape identification system 302. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In particular embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage device 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, the storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In particular embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from the computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital medium environment for analyzing and classifying images, a method for identifying a shape in an image, comprising:
   identifying an unknown shape within an image represented by a Béziér path, the Béziér path comprising at least one Béziér curve;
   identifying a known shape represented by a stored Béziér path, the stored Béziér path comprising at least one stored Béziér curve;
   determining, by at least one processor, a matrix transformation that transforms the at least one Béziér curve of the unknown shape to the at least one stored Béziér curve of the known shape, wherein the matrix transformation accounts for a change in scale and a change in skew between the at least one Béziér curve and the at least one stored Béziér curve;

applying the matrix transformation to the at least one Béziér curve of the unknown shape;

comparing the transformed at least one Béziér curve of the unknown shape to the at least one stored Béziér curve of the known shape to determine whether the unknown shape matches the known shape; and classifying the image based on the comparison of the at least one Béziér curve of the unknown shape to the at least one stored Béziér curve of the known shape.

2. The method of claim 1, further comprising classifying the unknown shape within the image using one or more properties from the known shape if the unknown shape matches the known shape.

3. The method of claim 1, wherein the known shape is stored in a database of known shapes, and wherein each known shape in the database of known shapes comprises one or more stored Béziér curves.

4. The method of claim 3, further comprising identifying the one or more stored Béziér curves representing the known shapes in the database of known shapes.

5. The method of claim 4, further comprising determining, for each of the one or more stored Béziér curves representing the known shapes, a matrix transformation that transforms the at least one Béziér curve of the unknown shape to the stored Béziér curve.

6. The method of claim 1, further comprising applying the matrix transformation to the Béziér path representing the unknown shape by applying the matrix transformation to each Béziér curve of a plurality of Béziér curves representing the unknown shape.

7. The method of claim 6, further comprising comparing the transformed Béziér path representing the unknown shape to the stored Béziér path of the known shape to determine if the unknown shape matches the known shape.

8. The method of claim 7, wherein determining if the unknown shape matches the known shape comprises determining whether the transformed Béziér path of the unknown shape is within tolerance level difference of the stored Béziér path of the known shape.

9. The method of claim 1, further comprising identifying Béziér points associated with the at least one Béziér curve of the unknown shape and corresponding stored Béziér points associated with the at least one stored Béziér curve of the known shape.

10. The method of claim 9, further comprising:
generating a plurality of equations based on the Béziér points associated with the at least one Béziér curve of the unknown shape and the corresponding stored Béziér points associated with the at least one stored Béziér curve of the unknown shape, the plurality of equations including a plurality of transformation variables; and
solving the plurality of equations to determine the plurality of transformation variables.

11. The method of claim 10, wherein the Béziér points associated with the at least one Béziér curve of the unknown shape comprise one or more Béziér points and one or more Béziér control points, and wherein the corresponding stored Béziér points associated in the at least one stored Béziér curve of the known shape comprise one or more stored Béziér point and one or more stored Béziér control point.

12. The method of claim 11, wherein generating the plurality of equations based on the Béziér points associated with the at least one Béziér curve and the corresponding Béziér points associated with the at least one stored Béziér curve comprise generating six equations using three of four sets of corresponding Béziér points.

13. The method of claim 12, wherein solving the plurality of equations to determine the plurality of transformation variables comprises solving the six equations to determine six transformation variables.

14. The method of claim 13, wherein determining the matrix transformation that transforms the at least one Béziér curve to the at least one stored Béziér curve comprises determining the matrix transformation based on the six determined transformation variables.

15. The method of claim 14, wherein the matrix transformation further accounts for a change in rotation and a change in position between the at least one Béziér curve and the at least one stored Béziér curve.

16. The method of claim 14, wherein comparing the transformed at least one Béziér curve of the unknown shape to the at least one stored Béziér curve of the known shape to determine whether the unknown shape matches the known shape comprises comparing a fourth set of corresponding Béziér points after applying the transformation matrix to the at least one Béziér curve.

17. In a digital medium environment for analyzing and classifying images, a method for identifying a shape in an unstructured form, comprising:
identifying an unknown shape within an image represented by a Béziér path, the Béziér path comprising at least one Béziér curve;
identifying a known form element represented by a stored Béziér path, the Béziér path comprising at least one stored Béziér curve;
determining, by at least one processor, a matrix transformation that transforms the at least one Béziér curve of the unknown shape to the at least one stored Béziér curve, wherein the matrix transformation accounts for a change in scale and a change in skew between the at least one Béziér curve and the at least one stored Béziér curve;
applying the matrix transformation to the at least one Béziér curve of the unknown shape;
comparing the transformed Béziér path of the unknown shape to the stored Béziér path of the known form element to determine that the unknown shape matches the known form element;
applying properties associated with the known form element to the unknown shape; and
classifying the image based on the comparison of the transformed Béziér path of the unknown shape to the stored Béziér path of the known form element.

18. The method of claim 17, wherein applying properties associated with the known form element to the unknown shape comprises applying user-input functionality to the unknown shape based on the user-input functionality of the known form element.

19. The method of claim 17, wherein the known form element is one of a blank text field, a radio button, a check box, or a comb field.

20. In a digital medium environment for analyzing and classifying images, a system for identifying a shape in an image, comprising:
at least one processor; and
at least one non-transitory computer readable storage medium storing instructions thereon, that, when executed by the at least one processor, cause the system to:
identify an unknown shape within an image represented by a Béziér path, the Béziér path comprising at least one Béziér curve;

identify a known shape represented by a stored Béziér path, the stored Béziér path comprising at least one stored Béziér curve;

determine a matrix transformation that transforms the at least one Béziér curve of the unknown shape to the at least one stored Béziér curve of the known shape, wherein the matrix transformation accounts for a change in scale and a change in skew between the at least one Béziér curve and the at least one stored Béziér curve;

apply the matrix transformation to the at least one Béziér curve of the unknown shape; and compare the transformed at least one Béziér curve of the unknown shape to the at least one stored Béziér curve of the known shape to determine whether the unknown shape matches the known shape; and classify the image based on the comparison of the at least one Béziér curve of the unknown shape to the at least one stored Béziér curve of the known shape.

* * * * *